United States Patent
Dixson et al.

[15] 3,701,375
[45] Oct. 31, 1972

[54] DEVICE FOR DEMOUNTING TIRES

[72] Inventors: Richard E. Dixson, 81635 Shadow Drive; Linus R. Merrill, both of Indio, Calif. 92201

[22] Filed: Oct. 14, 1970

[21] Appl. No.: 65,605

[52] U.S. Cl..................................157/1.33, 157/1.2
[51] Int. Cl..............................................B60c 25/06
[58] Field of Search..............................157/1.2, 1.33

[56] References Cited

UNITED STATES PATENTS

| | | | |
|---|---|---|---|
| 2,595,258 | 5/1952 | Hildred | 157/1.2 |
| 3,270,796 | 9/1966 | Smith | 157/1.2 |
| 3,266,548 | 8/1966 | Kolosowsky | 157/1.33 |

*Primary Examiner*—Granville Y. Custer, Jr.
*Attorney*—Lyon & Lyon

[57] ABSTRACT

A device for removing heavy duty tires from their wheel assemblies which employs a base, vertical press members mounted thereon and a movable platform which operates to force the rim of the wheel upwardly of the flange thereby reducing the pressure on the wheel assembly, and a lifting assembly for removing the annular bead seat band from the wheel assembly thereby rendering the tire and wheel assembly in condition for easy demounting.

6 Claims, 6 Drawing Figures

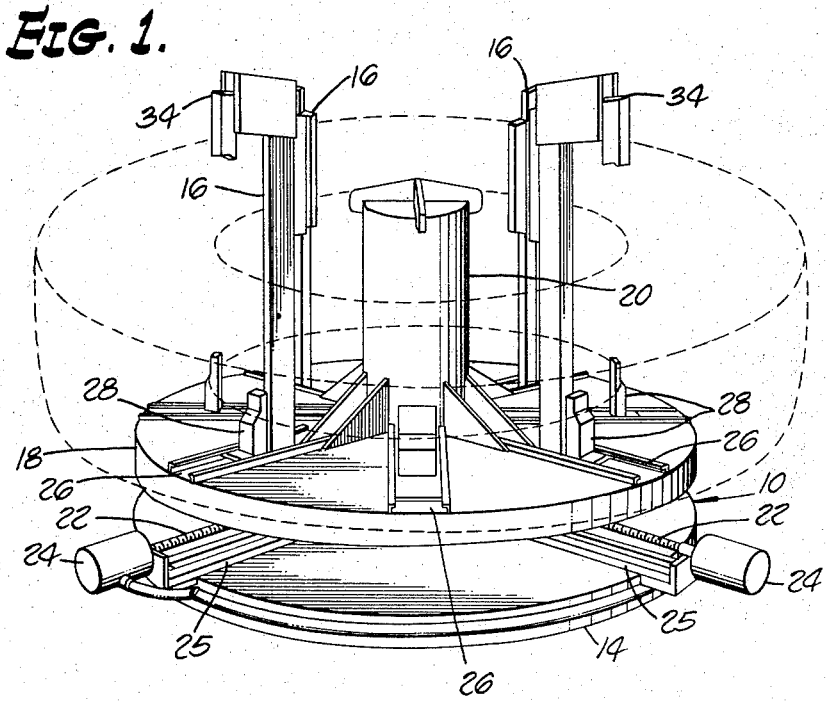
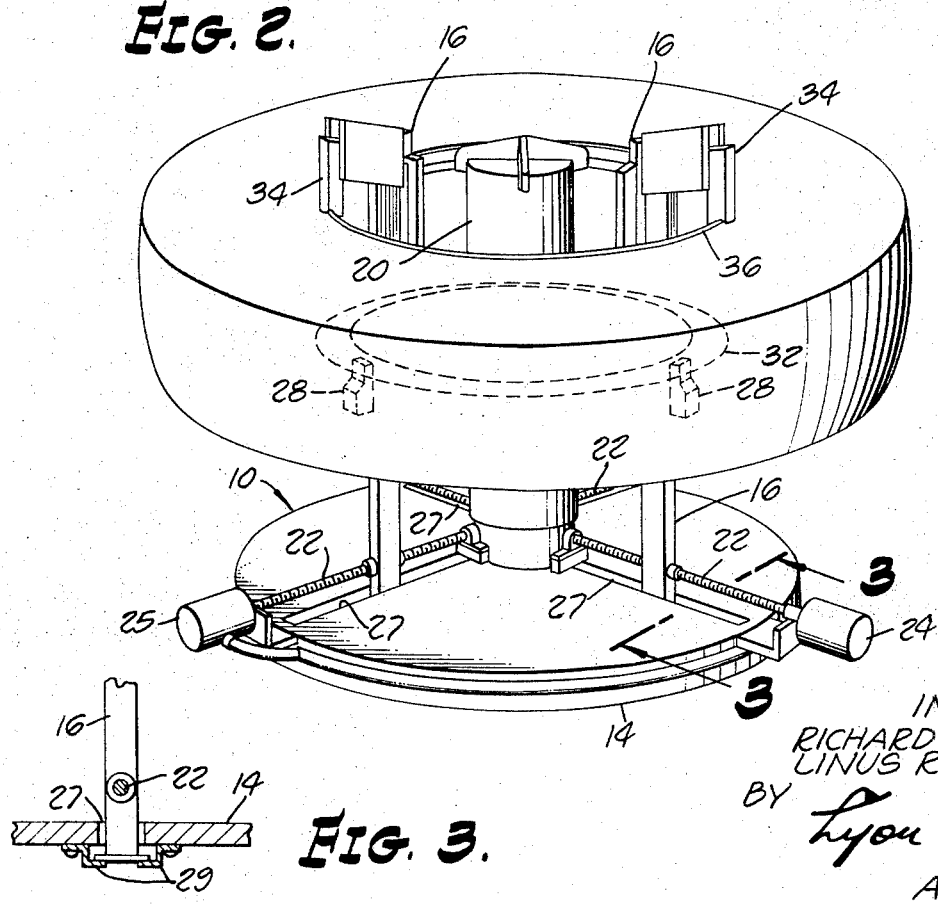
INVENTORS
RICHARD E. DIXSON
LINUS R. MERRILL
BY
Lyon & Lyon
ATTORNEYS

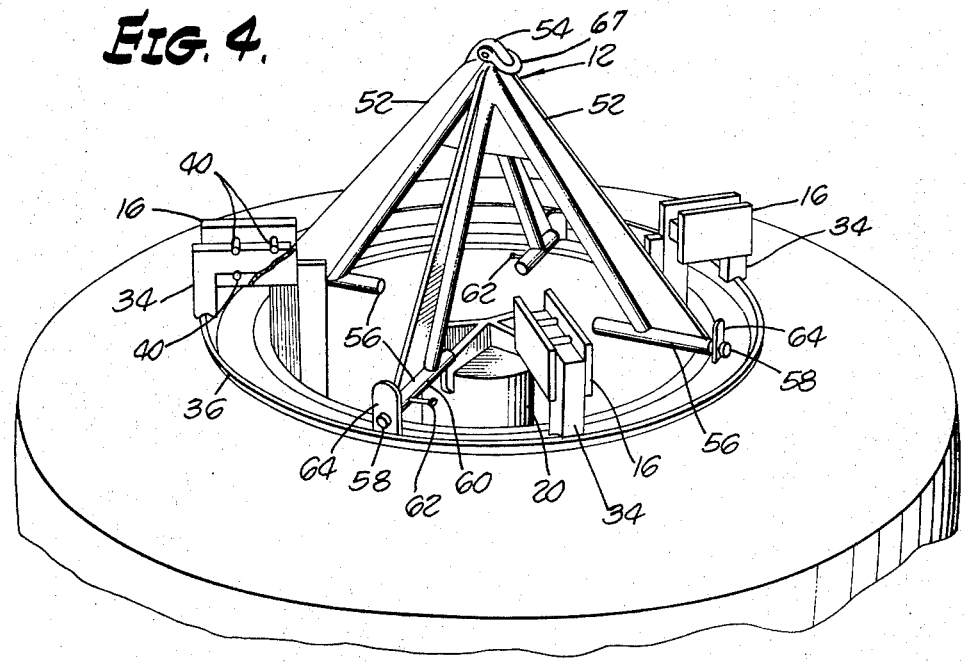
FIG. 4.
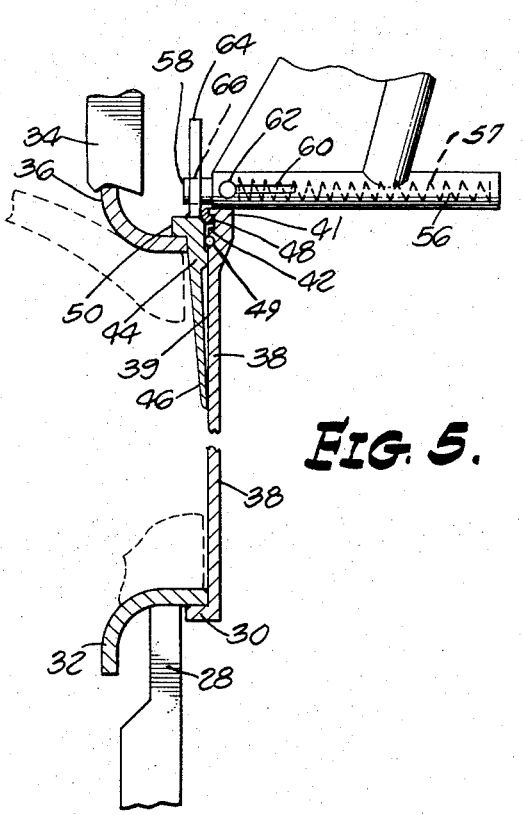
FIG. 5.
FIG. 6.
INVENTORS
RICHARD E. DIXSON
LINUS R. MERRILL
BY Lyon Lyon
ATTORNEYS

DEVICE FOR DEMOUNTING TIRES

BACKGROUND OF THE INVENTION

This invention is a device for demounting tires from their wheel assemblies and more particularly, a device which applies great pressure to the flanges of the wheel thereby relieving the pressure of the tire against the wheel and rendering the tire in condition for easy demounting.

Previously, the demounting of heavy duty tires from their wheel assemblies, the types used on large vehicles such as trucks, trailors and large earth moving equipment, was an extremely difficult, time consuming and hazardous job. The extreme pressures involved due to the size of the tires and the problems of recurrent rust and corrosion within the wheel assembly make manual demounting an all-day chore. Mechanical devices have been devised for this demounting operation, however, they generally utilize a form of C-clamp to aid in the wheel dismantling process as illustrated by U.S. Pat. No. 3,266,548 issued Aug. 16, 1966 to Kolosowsky. Due to the great forces required, these devices are generally inadequate, as the clamps are continually fracturing or slipping which not only prolongs the operation but creates a dangerous condition due to flying parts often resulting in injury.

It is therefore the principle object of this invention to provide an improved device for demounting large vehicle tires from their wheel assemblies.

It is a further object to provide a demounting device which has sufficient strength to demount extremely large tires without any slippage or part failure during the operation.

It is another object of this invention to provide a demounting device which is readily adjustable to demount tires of varying sizes.

These and other objects and advantages of the present invention will become apparent from the following detailed description taken in conjunction with the accompanying drawings.

Briefly, the device contains a base with vertical press members extending upwardly therefrom, each member having a downwardly facing contact element at its upper end. Above the base is a movable platform. The tire to be demounted is placed on the movable platform. Ear members are securely attached to the annular tire bead seat band which is found in all such large tires. The movable platform is then raised, the upper flange of the tire abutting the contact element on the vertical press members. When the platform is raised further, the tire rim and the annular bead seat band are forced away from the upper wheel flange decreasing the pressure of the flange against the seat band. A head assembly then lifts the annular tire bead seat band from the tire by the ear members attached to the band thereby relieving all pressure and allowing easy demounting of the tire.

IN THE DRAWINGS

FIG. 1 is an isometric elevation of the demounting device with the platform in the lowered position shown in conjunction with a tire.

FIG. 2 is an isometric elevation of the demounting device with the platform in the raised position shown in conjunction with a tire.

FIG. 3 is a cross sectional elevation of the base of the assembly taken along line 3—3 in FIG. 2.

FIG. 4 is an isometric elevation of the lifting assembly shown in conjunction with a portion of a tire and wheel assembly.

FIG. 5 is a sectional elevation showing a portion of the wheel assembly mounted in the press assembly and a portion of the lifting assembly secured to the annular seat band.

FIG. 6 is a broken away sectional elevation showing a portion of the wheel assembly after disassembly.

Referring now in detail to the drawings, the demounting press assembly 10 is comprised of a base platform 14, vertical press members 16, a movable platform 18, hydraulically or electrically actuated piston assembly 20 for raising and lowering the movable platform 18, radially extending threaded drive shafts 22 mounted on base platform 14 and connected to rotary motors 24. The vertical press members 16 are slidably mounted within tracks 25 which are positioned on base platform 14 and are in threaded contact with shaft 22, whereby the turning of shafts 22, by motors 24 causes the vertical press members to be moved within tracks 25 either radially inwardly or outwardly to adjust to the size of the tire being demounted. Having independent shafts, each with its own drive motor, allows each vertical press member 16 to be independently adjusted to assure proper placement of each of said members for each different tire placed on the assembly.

FIGS. 2 and 3 show a variation of the press assembly wherein the tracks for supporting and guiding the vertical press members 16 are comprised of guide slots 27 in base platform 14 and support means 29 mounted beneath platform 14.

Movable platform 18 has a plurality of radially extending tracks 26 thereon. The lower contact members 28 are mounted on tracks 26 and are manually positioned such that when a tire to be demounted is placed on movable platform 18, lower contact members flange 28 abut the annular rim flange 30 and lower wheel flange 32, as shown in FIGS. 5 and 6.

The upper end of the vertical press members 16 have contact elements 34 mounted therein. These elements abut the upper wheel flange 36 of the tire upon raising the movable platform 18, as shown in FIG. 4. To allow for variance among several tires in the distance between the rim of the upper wheel flange 36 and the tire rim 38, these contact elements must be adjustable. One method of incorporating the required flexibility is the use of substantially "L" shaped contact elements 34 which are slidably positioned between two rows of pins 40, as shown in FIG. 4. This allows the contact elements 34 to be easily adjusted to properly meet the upper wheel flange 36.

The wheel assembly of generally known construction is shown in FIG. 5. It comprises a rim 38, an annular rim flange 30 for retaining a lower wheel flange 32. The upper portion of rim 38 terminates in a relatively thick rim base section 41 in which is formed an annular groove 42. Annular groove 42 faces an annular tire bead seat band 44 having a tapered bead surface 46 surrounding rim portion 39. A split locking ring 48 is positioned in groove 42 and abuts annular tire seat band 44. A flexible "O" ring 49 is positioned between seat band 44 and rim portion 39 to prevent any air leakage from the tire. An outer annular flange portion 50 of seat band 44 limits the outward movement of tire flange 36.

With the parts of the wheel assembled and the tire mounted on the wheel and inflated as shown in FIG. 5, the tire retainer flanges 32 and 36 are held by the annular bead portion of the tire in fixed and rigid relation to rim flanges 30 and 50, the configuration and location of locking ring 48, which is held in annular groove 42 of the rim base 41, preventing outward axial movement of seat band 44 by engagement of seat band 44 with the adjacent surface of the locking ring. The wheel assembly therefore maintains the bead portion of the tire in securely fixed relation to all parts of the wheel assembly.

The lifting assembly, generally designated 12, whose function is to remove the annular bead seat band 44 from the wheel assembly, is comprised of a plurality of lifting arms 52 joined together at the center 54 and angled downwardly and outwardly towards the rim of the tire. Substantially horizontal tubes 56 are firmly secured to the lower portion of each arm. A locking bar 58 is slidably positioned within each tube 56. A biasing means 57 may be positioned behind bars 58 tending to urge the bars out of the tubes 56. Each tube has a slot 60 therein. Each locking bar 58 has a control rod 62 connected thereto and extending outwardly through slot 60, whereby the movement of the control rod controls the movement of the locking bar. Firmly attached to the annular bead seat band 44 are a plurality of ears 64, the number of ears and their degree of separation corresponding to the number of lifting arms 52 and their angular relationship to one another. Generally four ear members are used, quarterly spaced to provide equalitarial support of annular band 44 thereby reducing any possibility of band breakage. Each ear 64 has an aperture 66 therein adapted to receive a locking bar 58. It should be noted that ears 64 need not necessarily be permanently attached to the annular bead seat band 44, but may also be removable. The lifting assembly is equipped with a ring 67, whereby the assembly can be positioned over the tire placed on the press assembly 10, the locking bars are then pushed through apertures 66 thus securing the lifting assembly to the annular bead seat band 44.

In operation, the tire and wheel assembly is placed on movable platform 18 and the lower contact members 28 are adjusted in tracks 26 so that the tire and wheel assembly is supported by flange element 32 in abutment with lower contact member 28, as shown in FIGS. 1 and 5. With the wheel assembly thus supported, the hydraulic assembly 20 raises the movable platform 18, thus raising the tire and wheel assembly until upper wheel flange 36 is in imminent contact with contact elements 34. The elements 34 are adjusted to abut the upper flange 36 upon subsequent raising of the platform 18. The platform is then raised bringing the upper flange into contact with contact members 34. The pressure is then increased by further raising of the platform. Heretofore it has been extremely difficult to separate the bead seat band which must be removed to demount the tire from the upper wheel flange 36 in the demounting operation. This is a result not only of the great pressures involved due to the size of the tire, but also of a serious rusting condition which is likely to occur between the annular area of contact of the tire flange and seat band, thereby aggravating the problem of separating these parts so that the tire can be demounted from the wheel. The present invention eliminates this problem. As the pressure is increased, flange 32 is forced upwards and flange 36 is forced downward. This relieves the pressure on seat band 44 which then has only a loose running fit with the rim portion 39. The lifting assembly is secured to the seat band as described above, and when lifted from the press assembly, it removes the annular seat band 44 from the remainder of the wheel assembly allowing the split locking ring 48 to fall from the rim. The upper tire flange is then removed, the tire is removed from the rim and lower flange 32 from the press assembly.

Various changes and modifications may be made in carrying out the present invention without departing from the scope and spirit thereof. In so far as these changes and modifications are within the preview of the appended claims, they are to be considered as part of the invention.

What is claimed is:

1. A device for demounting tires from wheels having a rim, a lower annular rim flange, upper and lower annular wheel flanges, an annular tire bead seat means extending about the rim and having an upper flange portion and ear members comprising a base member, means for supporting said tire and wheel, a plurality of lower contact members carried by said supporting means and adapted to abut said lower wheel flange, a plurality of upper contact members carried by said base member, means for raising said supporting means with respect to said base member and bringing said upper annular wheel flange into abutment with said upper contact member so that upon further raising of said supporting means with respect to said base member and said upper contact members carried thereby, said upper and said lower annular wheel flanges are forced inwardly of said lower rim flange and said upper flange portion of said annular tire bead seat means thereby releasing the pressure on said annular bead seat means and lifting means for removing said annular bead seat means from said wheel upon the pressure against said seat means being reduced, said lifting means being adapted to hold said seat means by said ear members attached thereto.

2. A device for demounting tires from wheels having a rim, a lower annular rim flange, upper and lower annular wheel flanges, an annular tire bead seat means extending about the rim and having an upper flange portion and ear members comprising a base member, a moveable support platform for supporting said wheel and tire, a plurality of lower contact members carried by said movable platform and adapted to abut said lower annular wheel flange, means mounted on said base for raising and lowering said moveable platform with respect to said base member, a plurality of threaded axles positioned on said base member, means for rotating said axles, vertical press members slidably mounted on said base member and in threaded contact with said axles, whereby rotating said axles cause said press members to move radially inwardly or outwardly from the center of said base member and upper contact elements mounted on said press member, whereby upon raising said support platform with respect to said base member, vertical press members and said upper contact elements, said upper annular wheel flange abuts said upper contact members and said upper and lower annular wheel flanges are forced inwardly of said lower rim flange and said upper flange portion of said annular tire bead seat means thereby releasing the pressure on said annular bead seat means and a lifting assembly for removing the annular bead seat means from the wheel upon the pressure against said bead seat means being reduced, said lifting assembly being adapted to hold said seat means by said ear members attached thereto.

3. The combination of claim 2 wherein said lifting assembly comprises a plurality of arm members, a substantially horizontal tubular member fastened to the lower portion of each of said arm members, a locking bar slidably mounted within each of said tubular members, an exterior slot in each of said tubular members, a control rod connected to each of said locking bars and extending therefrom and through said slots whereby the movement of the locking bars can be directed by the movement of said control rods.

4. The combination of claim 3 wherein biasing means are positioned in said tubular members and against said locking bars urging said locking bars out of said tubings.

5. The combination of claim 4 wherein said contact elements are substantially "L" shaped and adjustably mounted between a pair of rows of pins carried by said pressing member.

6. The combination of claim 5 wherein said rotating means comprises a plurality of motors, a motor being connected to and driving each of said axles.

* * * * *